(12) United States Patent
Allen et al.

(10) Patent No.: US 12,376,682 B2
(45) Date of Patent: Aug. 5, 2025

(54) LOCKER WITH INDUCTIVE CHARGER

(71) Applicant: AIM Design, LLC, Desoto, TX (US)

(72) Inventors: Sam Allen, Maypearl, TX (US); John Allen, Desoto, TX (US)

(73) Assignee: AIM Design, LLC, Desoto, TX (US)

( * ) Notice: Subject to any disclaimer, the term of this patent is extended or adjusted under 35 U.S.C. 154(b) by 512 days.

(21) Appl. No.: 17/195,009

(22) Filed: Mar. 8, 2021

(65) Prior Publication Data

US 2021/0186221 A1 Jun. 24, 2021

Related U.S. Application Data

(63) Continuation of application No. 16/454,161, filed on Jun. 27, 2019, now Pat. No. 10,939,767.

(51) Int. Cl.

| | |
|---|---|
| *A47B 61/00* | (2006.01) |
| *A47C 7/24* | (2006.01) |
| *A47C 7/72* | (2006.01) |
| *A47C 15/00* | (2006.01) |
| *H02J 7/00* | (2006.01) |
| *H02J 50/10* | (2016.01) |
| *A47B 83/00* | (2006.01) |

(Continued)

(52) U.S. Cl.
CPC .............. *A47C 7/72* (2013.01); *A47B 61/00* (2013.01); *A47C 7/24* (2013.01); *A47C 15/004* (2013.01); *H02J 7/0044* (2013.01); *H02J 7/0047* (2013.01); *H02J 50/10* (2016.02); *A47B 83/00* (2013.01); *A47B 97/00* (2013.01); *A47B 2220/0091* (2013.01); *H02J 50/90* (2016.02)

(58) Field of Classification Search
CPC ..................................................... A47B 61/00
See application file for complete search history.

(56) References Cited

U.S. PATENT DOCUMENTS

| | | | |
|---|---|---|---|
| 2005/0005531 A1* | 1/2005 | Stultz ...................... | G07F 17/10 52/27 |
| 2008/0211458 A1* | 9/2008 | Lawther .................. | H02J 50/10 320/132 |

(Continued)

FOREIGN PATENT DOCUMENTS

| | | | | |
|---|---|---|---|---|
| CN | 201881928 U | * | 6/2011 | |
| CN | 104967221 A | * | 10/2015 | .............. H02J 17/00 |

(Continued)

OTHER PUBLICATIONS

Notice of Allowance Dated Jan. 8, 2021 from U.S. Appl. No. 16/454,161.

(Continued)

*Primary Examiner* — Timothy J Brindley
(74) *Attorney, Agent, or Firm* — James E. Walton

(57) ABSTRACT

A locker includes a pair of spaced-apart upstanding sidewalls and at least one compartment defined between the upstanding sidewalls. A horizontal member extends at least partially between the sidewalls. An inductive charger is carried by the horizontal member and located such that an electronic device placed on the horizontal member may be charged by the charger. A visible indicia is disposed on the horizontal member indicating the location of the inductive charger; and an illuminated indicia is disposed on the horizontal member to indicate charging of the device.

14 Claims, 2 Drawing Sheets

(51) Int. Cl.
*A47B 97/00* (2006.01)
*H02J 50/90* (2016.01)

(56) References Cited

U.S. PATENT DOCUMENTS

| | | | |
|---|---|---|---|
| 2009/0212637 A1* | 8/2009 | Baarman | H04B 5/00 |
| | | | 307/104 |
| 2010/0201202 A1 | 8/2010 | Kirby et al. | |
| 2010/0219698 A1* | 9/2010 | Azancot | H02J 50/12 |
| | | | 307/104 |
| 2011/0025181 A1* | 2/2011 | Vinke | A47B 67/04 |
| | | | 439/577 |
| 2013/0207478 A1* | 8/2013 | Metcalf | H04B 5/0075 |
| | | | 307/104 |
| 2015/0077049 A1 | 3/2015 | Smith | |
| 2016/0258108 A1* | 9/2016 | Jindra | A47B 81/00 |
| 2017/0244262 A1 | 8/2017 | Schadow et al. | |
| 2017/0356218 A1 | 12/2017 | Beasley et al. | |
| 2018/0012438 A1* | 1/2018 | Sinofsky | G07F 15/12 |
| 2018/0172301 A1* | 6/2018 | Allen | F24F 7/08 |
| 2018/0191178 A1* | 7/2018 | Byrne | A47C 7/72 |
| 2018/0262030 A1 | 9/2018 | Zadvinskis | |
| 2019/0365094 A1* | 12/2019 | Allen | F24F 7/00 |
| 2021/0212467 A1* | 7/2021 | Mort | F21V 23/0471 |

FOREIGN PATENT DOCUMENTS

| | | | |
|---|---|---|---|
| CN | 108741727 A | * | 11/2018 |
| JP | 2012210125 A | * | 10/2012 |
| KR | 20210027684 A | * | 3/2021 |

OTHER PUBLICATIONS

Amendment After Final Dated Dec. 21, 2020 from U.S. Appl. No. 16/454,161.
Final Office Action Dated Nov. 2, 2020 from U.S. Appl. No. 16/454,161.
Amendment Dated Oct. 20, 2020 from U.S. Appl. No. 16/454,161.
Office Action Dated Aug. 26, 2020 from U.S. Appl. No. 16/454,161.

* cited by examiner

LOCKER WITH INDUCTIVE CHARGER

This application is a continuation of U.S. patent application Ser. No. 16/454,161, filed on 27 Jun. 2019, titled "Locker with Inductive Charger," which is incorporated herein for all purposes.

BACKGROUND

1. Field of the Invention

The present invention relates generally to improvements in lockers or storage cabinets used in athletic or sporting facilities, and more specifically to electronic components of such lockers.

2. Description of Related Art

The aesthetics and utility of lockers or storage cabinets in "locker rooms" of athletic and sporting facilities of sports teams and country clubs, for example, have become a measure of the quality and prestige of such organizations and an increasingly important aspect of recruiting new team or club members. Modern lockers are a far cry from the simple wood or metal cabinets of the past.

Modern lockers incorporate storage for specific items of equipment, such as helmets and shoes, and features promoting comfort and luxury. There is a constant need for improvement in both functional and aesthetic aspects of such lockers, including the ability to store athletic or sporting equipment as well as "street clothes" and other property a user brings into the locker room, along with the ability to provide electrical functionality.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
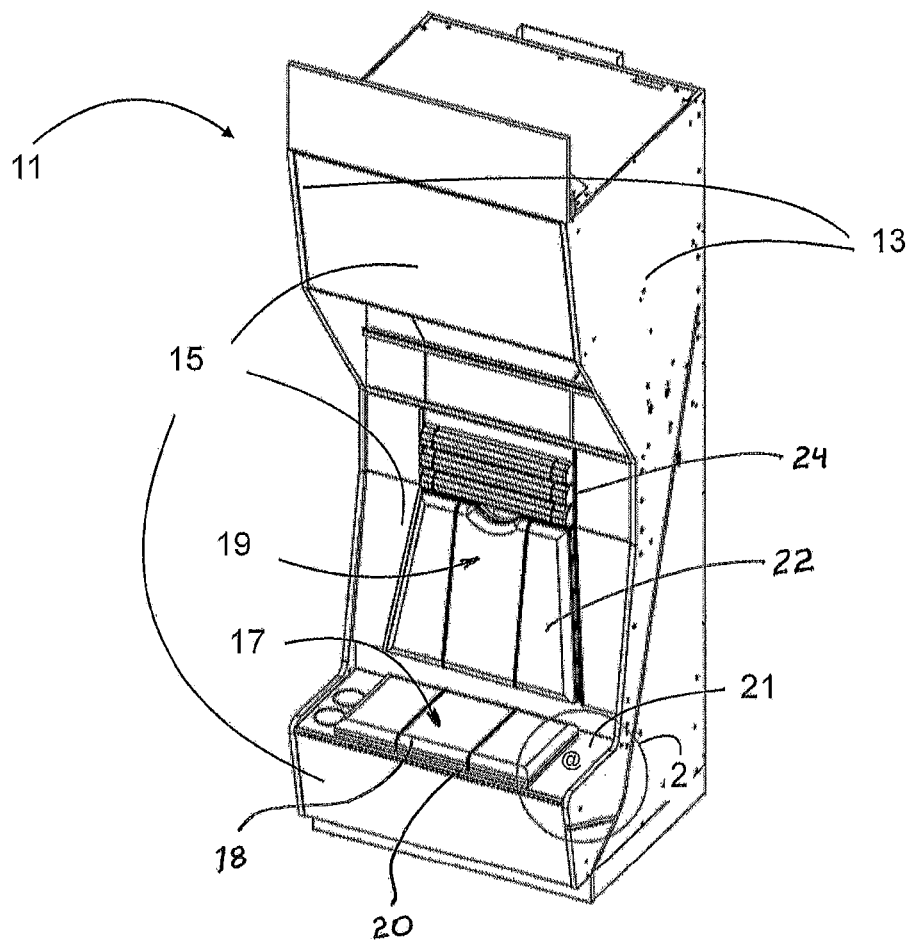
FIG. 1 is a perspective view of a locker according to the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, combinations, equivalents, and alternatives falling within the spirit and scope of the present application as defined by the appended claims.

DETAILED DESCRIPTION OF THE PREFERRED EMBODIMENT

Illustrative embodiments of the locker of the present application are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1 in the drawings, a locker 11 according to the present application is illustrated. As can be seen, locker 11 comprises a pair of upstanding sidewalls 13 that generally define the extent of locker 11. Sidewalls 13 may be connected at the rear by a back wall. Each locker 11 may be installed adjacent to another, similar or identical locker, with the rear of each locker 11 being against a wall or other structure, and the front of each locker 11 facing the interior of the locker room.

Between sidewalls 13 of locker 11, a plurality of compartments 15 are defined by dividers that may include generally vertical panels parallel to sidewalls 13, one or more shelves or other horizontally extending surfaces, panels, and/or platforms that serve to connect sidewalls 13 and lend rigidity and strength to locker 11, in addition to forming compartments 15. Each compartment 15 may be sized and otherwise configured for storage of clothing or sporting equipment or other items and may include a door, which may be lockable. Locker 11 may also include a generally horizontal seat member 17, which sits atop a "footlocker" or lowermost compartment 15, and is preferably forward of the remainder of locker 11. Seat member 17 preferably includes a padded and/or upholstered upper portion 18 and a rigid lower portion 20. Seat member 17 is preferably adjacent to a seatback 19. Seatback 19 is preferably a folding seatback having a lower portion 22 and an upper headrest portion 24. In the preferred embodiment, seatback 19 also functions as a door to a compartment behind seatback 19, as disclosed in commonly invented and assigned U.S. Pat. Nos. 10,080,433; 10,299,583; D826,602; and D845,680, all of which are incorporated herein by reference in their entirety.

Adjacent padded upper portion 18, or on any other generally horizontal surface or member of locker 11, an electronics charger 21 may be incorporated or located and identified by a logo (team mascot or name, or club logo, or text) or other indicia (indicated by "@" in FIG. 1). Charger 21 preferably is of the "Qi" type of inductive charger that is capable of charging a wireless phone or other electronic device, provided with corresponding charging components, that is place in proximity to charger 21. The logo or other indicia indicates to the user the location of the charger and thus where to place the device to effectuate charging. Charger 21 may be one of several electronic components conductively coupled to an electrical subsystem carried by locker 11 for controlling the various electrical components, such as electric locks, security systems, ventilation systems, high-speed drying systems, lights, televisions, alarms, computer networks, etc.

Figure 2:
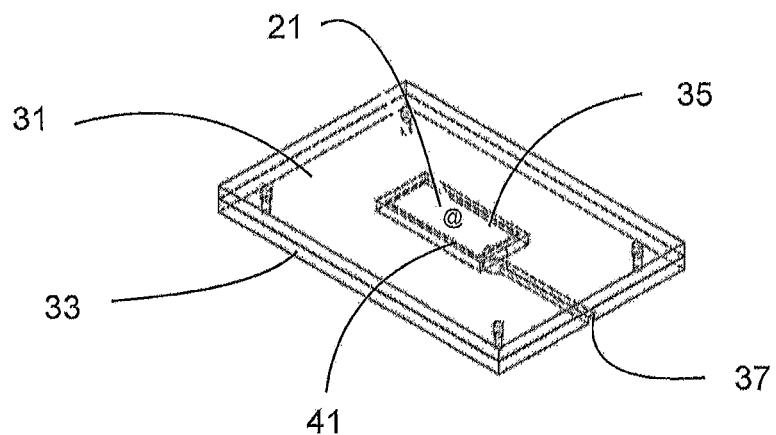
FIG. 2 is an enlarged perspective view of a portion of the locker of FIG. 1.
Figure 3:
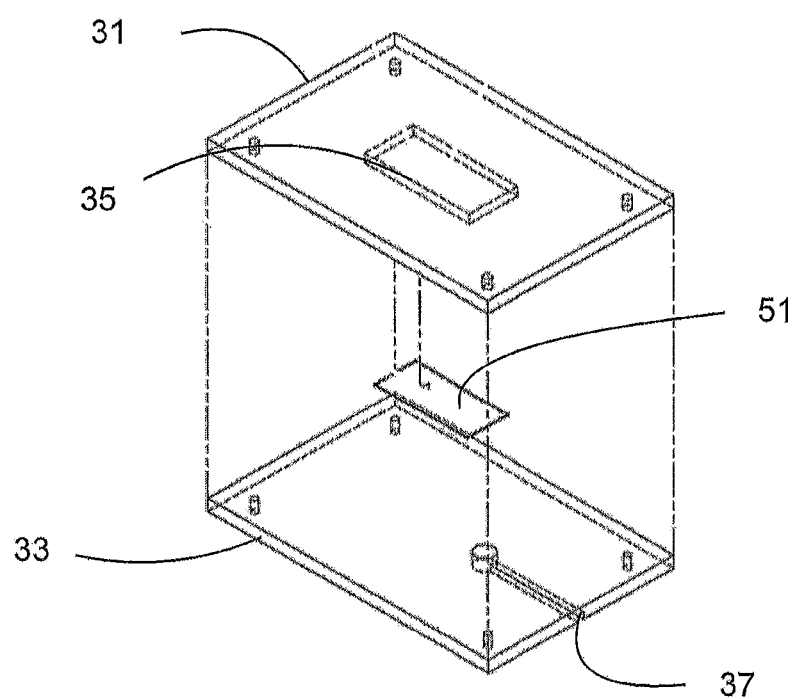
FIG. 3 is an exploded view of the portion of the locker illustrated in FIG. 2.

Referring now also to FIGS. 2 and 3 in the drawings, a preferred assembly of charger 21 into seat or other horizontal surface or divider is illustrated in greater detail, as indicated by the detail numbered "2" in FIG. 1. As depicted, rigid lower portion 20 of seat member 17 or other horizontal surface comprises a "sandwich" of an upper panel 31 and a lower panel 33, which may be held together at the corners or other appropriate locations by screws or other appropriate fasteners. A pocket 35 may be defined in rigid lower portion 20 and preferably is formed in upper panel 31 (or lower panel 33, or both) to receive a charging unit 51. Pocket 35 may leave a thin layer of the material of panel 31 to cover the charging unit (without interfering with the coupling between the device and charging unit 51), or may be open (cut through the entire thickness of upper panel 31) and covered or filled with a polymeric (or other material) cover. In this manner, charger 21 may be flush with, recessed within, or upraised relative to panel 31. Charger 21 may include a switch for activating and deactivating charger 21.

A team logo or shape or outline or other visible indicia (indicated by "@") may be provided on upper panel 31 above and proximal pocket 35 to indicate proper placement of the device for charging. A channel 37 may be formed in lower panel 33 (or both upper panel 31 and lower panel 33, or just upper panel 31) to provide a conduit for the power cable(s) leading to charging unit 51. Preferably, channel 37 extends toward the rear or sidewall 13 of locker 11 to feed the power cable(s) toward an electrical power source within locker 11 or outside of locker 11, depending on other aspects of the configuration of locker 11.

An illuminated indicia in the form of one or more LED devices 41 may be provided in or on upper panel 31 proximal to or in the vicinity of the logo or charger 21, or may comprise part of the logo (eyes of an animal logo, outline, etc.), or may comprise part or all of an outline corresponding to the location of charger 21. LED devices 41 may be illuminated to provide an indication that the charger is powered and functional and ready to charge. LED devices 41 may change color to indicate that charging unit 51 is coupled with and charging a device in proximity to charger 21. For example, LED devices 41 may comprise two discrete LEDs, one to indicate power and another to indicate charging.

In operation, a user seated on seat member 17 may place his or her phone or other inductive-charging-capable device on the logo or indicia indicating the location of charger 21. Coupling between the device and charging unit 51 then will charge the device while the device remains within "range" of charger 21. LED devices 41 indicate the readiness of charger 21 and/or that the device is coupled to charger 21 and being charged.

It is apparent that a system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description and claims. Although the present embodiments are shown above, they are not limited to just these embodiments, but are amenable to various changes and modifications without departing from the spirit thereof.

We claim:

1. A locker, comprising:
    a pair of spaced-apart upstanding sidewalls;
    a horizontal member extending at least partially between the sidewalls;
    an inductive charger carried by the horizontal member and located such that an electronic device placed on the horizontal member may be charged by the charger; and
    a visible indicia on the horizontal member indicating the location of the inductive charger;
    wherein the horizontal member comprises:
        an planar upper panel;
        a planar lower panel; and
        at least one pocket formed in the planar upper panel, the planar lower panel, or both the planar upper panel and the planar lower panel, the pocket being defined by the upper panel and the lower panel, the pocket being formed by fastening the planar upper panel to the planar lower panel;
    wherein the inductive charger is disposed in the pocket;
    wherein an individual may use the electronic device while placed on the inductive charger;
    wherein the section of the planar upper panel above the pocket is removed and replaced with another material as a cover; and
    wherein the planar upper panel is attached to the planar lower panel via one or more fasteners that pass through both the upper panel and the lower panel.

2. The locker according to claim 1, wherein the horizontal member is a seat bottom.

3. The locker according to claim 1, wherein the horizontal member is a shelf.

4. The locker according to claim 1, wherein the visible indicia comprises:
    a logo.

5. The locker according to claim 1, further comprising:
    one or more LED devices.

6. The locker according to claim 1, wherein the visible indicia is disposed in the upper panel proximal the pocket.

7. The locker according to claim 1, wherein the inductive charger comprises:
    a charging unit; and
    one or more power cables for conductively connecting the charging unit to an electrical power source.

8. The locker according to claim 7, further comprising:
    a channel passing through the upper panel, the lower panel, or both the upper panel and lower panel, the channel being configured to receive the power cables.

9. The locker according to claim 7, wherein the electrical power source is within the locker.

10. The locker according to claim 7, wherein the electrical power source is outside of the locker.

11. The locker according to claim 1, wherein the inductive charger is flush with, recessed within, or upraised relative to the upper panel.

12. The locker according to claim 1, further comprising:
    a switch for activating the inductive charger.

13. A locker, comprising:
    a pair of spaced-apart upstanding sidewalls;
    at least one compartment defined between the upstanding sidewalls;
    a horizontal member disposed within the at least one compartment, the horizontal member extending at least partially between the sidewalls;
    an inductive charger disposed within the horizontal member and located such that an electronic device placed on the horizontal member may be charged by the charger;
    a visible indicia on the horizontal member disposed within the compartment for indicating the location of the inductive charger;
    an illuminated indicia disposed within the compartment to indicate charging of the device;
    a headrest portion; and
    a seat portion;
    wherein the horizontal member comprises:
        a planar upper panel;
        a planar lower panel;
        at least one pocket formed in the planar upper panel, the planar lower panel, or both the planar upper panel and the planar lower panel, the pocket being defined by the upper panel and the lower panel, the pocket being formed by fastening the planar upper panel to the planar lower panel; and a channel passing through the upper panel, the lower panel, or both the upper panel and lower panel, the channel being configured to receive a power cable;

wherein the inductive charger is disposed in the at least one pocket;

wherein the planar upper panel is attached to the planar lower panel via one or more fasteners that pass through both the upper panel and the lower panel;

wherein an individual may use the electronic device while placed on the inductive charger; and wherein the section of the planar upper panel above the pocket is removed and replaced with another material as a cover.

14. The locker according to claim 13, further comprising:

an electrical subsystem conductively coupled to the inductive charger.

* * * * *